United States Patent [19]
Chambers et al.

[11] Patent Number: 5,406,983
[45] Date of Patent: Apr. 18, 1995

[54] CORROSION-RESISTANT COMPOSITE COUPLINGS AND TUBULAR CONNECTIONS

[75] Inventors: Michael R. Chambers, Bedford; Richard A. Sukup, Burleson, both of Tex.

[73] Assignee: Mobil Oil Corporation, Fairfax, Va.

[21] Appl. No.: 214,086

[22] Filed: Mar. 16, 1994

Related U.S. Application Data

[63] Continuation of Ser. No. 976,595, Nov. 13, 1992, abandoned.

[51] Int. Cl.6 .............................................. F16L 9/14
[52] U.S. Cl. ........................... 138/109; 138/DIG. 2; 138/143; 285/53; 285/292
[58] Field of Search .................. 38/106, 109, 113, 114, 38/115, 116, 143, 147, 153, 177, DIG. 2, DIG. 7; 285/53, 254, 292, 398

[56] References Cited

U.S. PATENT DOCUMENTS

| | | | |
|---|---|---|---|
| 400,600 | 4/1889 | Rockwell | 285/53 |
| 599,558 | 2/1898 | Greenfield | 285/53 |
| 1,040,971 | 10/1912 | Wirt | 285/53 |
| 1,856,415 | 5/1932 | Halperin et al. | 285/53 |
| 3,432,186 | 3/1969 | Braun | 285/53 |
| 3,462,175 | 8/1969 | Johnson | 285/53 |
| 3,508,766 | 4/1970 | Kessler et al. | 285/21 |
| 3,652,409 | 3/1972 | Mack et al. | 252/12 |
| 3,658,938 | 4/1972 | Kwaitkowski et al. | 260/857 |
| 3,712,932 | 1/1973 | Balme et al. | 260/857 |
| 3,744,530 | 7/1973 | Perry | 138/145 |
| 3,801,379 | 2/1974 | Blackwell | 148/6.27 |
| 3,819,407 | 6/1974 | Oates et al. | 117/138.8 |
| 4,011,652 | 3/1977 | Black | 285/292 |
| 4,017,555 | 4/1977 | Alvarez | 260/857 PA |
| 4,139,576 | 2/1979 | Yoshimura et al. | 260/857 |
| 4,156,049 | 5/1979 | Hodes et al. | 428/409 |
| 4,261,390 | 4/1981 | Belofsky | 138/153 |
| 4,366,971 | 1/1983 | Lula | 138/109 |
| 4,396,658 | 8/1983 | Mettes et al. | 428/36 |
| 4,398,754 | 8/1983 | Caroleo et al. | 285/53 |
| 4,400,019 | 8/1983 | Fruck | 285/55 |
| 4,443,571 | 4/1984 | Needham et al. | 524/409 |
| 4,522,432 | 6/1985 | Press | 138/147 |
| 4,680,224 | 7/1987 | O'Connor | 428/408 |
| 4,701,231 | 10/1987 | Peters et al. | 138/109 |
| 4,856,828 | 8/1989 | Kessler et al. | 285/334.1 |
| 4,913,465 | 4/1990 | Abbema et al. | 285/22 |
| 5,129,689 | 7/1992 | Newski et al. | 285/398 |
| 5,135,267 | 8/1992 | Wilson | 285/398 |

Primary Examiner—David A. Scherbel
Assistant Examiner—James F. Hook
Attorney, Agent, or Firm—Alexander J. McKillop; George W. Hager, Jr.

[57] ABSTRACT

A corrosion-resistant connection for use with tubular members having externally threaded ends. The connection includes a stress-bearing sleeve member having an interior surface and an exterior surface; and a fiber-filled polymeric composite shell having at least one internally threaded portion therein, the composite shell molded to the sleeve so as to be coaxially aligned and in close conforming contact with at least a substantial portion of the interior surface of the sleeve member. The composite shell has a thickness of greater than about 0.04 inches.

15 Claims, 4 Drawing Sheets

CORROSION-RESISTANT COMPOSITE COUPLINGS AND TUBULAR CONNECTIONS

This application is a continuation of application Ser. No. 07/976,595, filed Nov. 13, 1992, now abandoned.

FIELD OF THE INVENTION

The present invention relates to the field of tubular connections for use with pipe and tubular members and, more particularly, to corrosion-resistant couplings and hardware for use in oil wells and other harsh applications where the potential for corrosion exists.

BACKGROUND OF THE INVENTION

In the production of oil, gas and other valuable minerals from subterranean wells, large numbers of pipe and tubular sections are often employed, such sections typically connected by threaded couplings. Interior surfaces of these tubular sections and their associated couplings are frequently subjected to temperatures in excess of 350° F. pressures as high as 20,000 PSI, and environments which may be highly corrosive, such as those produced by the presence of hydrocarbons, $CO_2$ and $H_2S$ in the presence of water. The use of secondary and tertiary enhanced recovery methods in oil fields may tend to further aggravate the situation.

Pipe sections used in oil fields usually have a tapered, exteriorly threaded male end called a pin member. Such pin members are threaded into couplings, collars or integral female pipe sections, their threaded ends being referred to as box members. These box members have an interiorly threaded tapered end which corresponds with their respective pin members. As can readily be appreciated, these components, when produced from steel are subject to attack by corrosion.

Corrosion in metals is caused by the flow of electricity from one metal to another metal or from one part of the surface of one piece of metal to another part of the same metal where conditions permit the flow of electricity. Further, a moist conductor or electrolyte must be present for this flow of energy to take place. Energy passes from a negative region to a positive region via the electrolyte media. Several types of corrosion mechanisms exist, including: bi-metallic corrosion, erosion-corrosion (also known as impingement), stress corrosion, intergranular corrosion, and galvanic corrosion.

Electrical contact or coupling of dissimilar metals frequently causes increased corrosion, this form of corrosion generally referred to as galvanic corrosion. Galvanic corrosion is quite prevalent and troublesome, occurring in a wide variety of circumstances. For example, coupling aluminum and iron pipe together will result in very rapid corrosion of the aluminum pipe section. The galvanic corrosion mechanism may be illustrated by considering the effect of electrically connecting zinc to platinum immersed in sea water. Under these conditions, the platinum is inert and does not corrode, while the zinc is attacked. The reactions occurring on the surface of the zinc are the anodic oxidation of zinc to zinc ions, and the cathodic reduction of dissolved oxygen to hydroxide ions. If the electrical potentials of these two metals are measured, the platinum would be found to have a positive potential, while the zinc would be found to have a negative potential. As may be appreciated, as the potential difference increases, galvanic corrosion increases.

Obviously, from a corrosion standpoint, the replacement of steel tubulars and associated hardware with materials less subject to corrosion would be highly desirable in gas and oil field applications, if it were practical. While the use of corrosion resistant alloys for corrosion control have demonstrated superior corrosion resistance properties, they are quite costly and exhibit complex manufacturing and handling constraints. Non-metallic components, such as fiberglass casing, tubing, sucker rods and the like are finding their way into oil field applications. Performance limitations, including service loads, pressures and temperatures, restrict the across-the-board replacement of metallic hardware, however.

In practice, to guard against galvanic corrosion, insulative coatings are frequently applied. In order for a coating to be used on tubular sections and threaded couplings to protect the metal substrate from corrosion, the coating must be resistant to attack and maintain its adherence to the metal substrate under the harsh conditions referred to above. In various oil and gas applications, steel pipe is provided with a lining of corrosion-resistant material. For example, it is known to bond to the interior of the pipe various epoxy-based coatings, as well as coatings containing polyethylene, polyvinyl chloride and other thermoplastic and thermosetting materials.

Of the various polymeric coating materials, arylene sulfide polymers have gained wide acceptance and are well known in the art. (See U.S. Pat. No. 3,354,129 to Edmonds, Jr. et al.) Generally, these polymers consist of a recurring aromatic structure coupled in repeating units through a sulfur atom. Commercially available arylene sulfide polymers which have been used for coating oil and gas pipes and pipe couplings are polyphenylene sulfides. The polyphenylene sulfides used in oil and gas applications exhibit high melting points, outstanding chemical resistance, thermal stability and are non-flammable. They are also characterized by high stiffness and good retention of mechanical properties at elevated temperatures as well as the ability to deform smoothly, thereby, for example, preventing the galling of threads, even at high thicknesses. U.S. Pat. No. 3,744,530, issued to Perry, describes polyphenylene sulfide coated pipes, wherein the polyphenylene sulfide coating also contains a filler, such as iron oxide, in an amount of between 5% to 30%.

While polymeric coated pipes and couplings have gained wide acceptance in applications requiring corrosion protection, the cracking of such coatings during installation and in use tends to limit the insulative effect of such coatings, increasing the likelihood that galvanic corrosion will take place. This is particularly true in the pin-end area where cracking occurs during assembly, when the threaded portion undergoes deformation. Moreover, the polymeric coatings of threaded couplings are particularly prone to cracking due to the stresses imparted during assembly.

Despite the advances in the corrosion protection of oil-field tubulars, couplings and associated hardware, a need exists for hardware of improved corrosion resistance which possess the mechanical properties necessary to serve in oil field and similar service.

SUMMARY OF THE INVENTION

In accordance with the present invention, there is provided a corrosion-resistant coupling for use with tubular members having externally threaded ends. The coupling includes a stress-bearing sleeve member having an interior surface and an exterior surface and a fiber-filled polymeric composite shell having at least one internally threaded portion therein, the composite shell molded to the sleeve so as to be coaxially aligned and in close conforming contact with at least a substantial portion of the interior surface of the sleeve member, wherein the composite shell has a thickness of greater than about 0.04 inches.

Accordingly, it is an object of the present invention to provide a corrosion-resistant coupling for use with tubular members having threaded ends.

It is another object of the present invention to provide a coupling which will act as a galvanic corrosion insulator for coupling tubings of dissimilar metals.

It is a further object of the present invention to provide a coupling which will provide the mechanical properties necessary to provide good service life in oil field applications.

It is yet another object of the present invention to provide a coupling which is both corrosion resistant and capable of providing good sealing characteristics.

Other objects and the several advantages of the present invention will become apparent to those skilled in the art upon a reading of the specification and the claims appended thereto.

BRIEF DESCRIPTION OF THE DRAWINGS

Reference may now be had to the following detailed description of exemplary embodiments of a protective apparatus in accordance with the present invention, taken in conjunction with the accompanying drawings; in which.

DETAILED DESCRIPTION OF THE INVENTION

The present invention is best understood by reference to the appended figures, which are given by way of example and not of limitation.

To achieve the objects hereinabove stated, composite technology is utilized. Composites employ a combination of high performance fibers combined in a polymeric matrix. Composite structures rely on the fibers for load carrying ability and on the matrix to hold the fibers together and transfer the load between them. Composites have shown promise in a wide variety of applications. In recent years, composite technology has been called upon to meet material performance requirements beyond the capabilities of metals in certain applications.

Fibers contemplated for use in the composite material employed in the practice of the present invention will have a higher modulus of elasticity, higher tensile strength and higher compressive strength than the polymeric material used as the matrix. The fibers to be used also require a high bonding capacity and should be inert to the polymeric material and all chemical components which it will come in contact with. Such fibers contemplated for use include glass, ceramic, carbon, asbestos, synthetics such as polyamides, polyesters, aramids or the like, with glass and carbon being particularly preferred. It is also preferred that the overall composite material contain at least about 40% fibers, on a volumetric basis, with a fiber content of at least about 60% being particularly preferred. The selection of the length of the fibers to be used is also important to the overall characteristics of the resultant composite, with fiber lengths ranging from about 0.1 to about 0.4 inches being preferred in most applications. Particularly preferred in the practice of the present invention are fibers having an average length of about 0.25 inches.

The polymeric matrix material for use in forming the composite material may consist of resin-hardened combinations based on epoxy resins, phenolic resins, melamine resins, silicone resins, hydrocarbon-based resins, vinyl ester resins, polyester resins and other thermoplastic and thermosetting materials having the requisite physical and thermal properties, as those skilled in the art will plainly recognize.

Of the various polymeric matrix materials, arylene sulfide polymers are preferred for use in the practice of the present invention. As mentioned above, these polymers consist of a recurring aromatic structure coupled in repeating units through a sulfur atom. Polyphenylene sulfides are preferred as they exhibit high melting points, outstanding chemical resistance, thermal stability, are non-flammable and are characterized by high stiffness and good retention of mechanical properties at elevated temperatures. As will be discussed in more detail below, their ability to deform smoothly is well exploited in the practice of a preferred embodiment of the present invention. The preparation of polyphenylene sulfide polymers is described in detail in U.S. Pat. No. 3,354,129 to Edmonds, Jr. et al., the contents of which are hereby incorporated by reference for those details. As indicated in U.S. Pat. No. 3,354,129, these polymers are prepared by reacting a poly-halo-substituted cyclic compound which is unsaturated between adjacent ring atoms and an alkali metal sulfide in a polar organic compound. The resulting polymer contains the cyclic structure of the poly-substituted compound coupled in repeating units through a sulfur atom. A particularly preferred polyphenylene sulfide for use in the practice of the present invention is produced and sold by the Phillips Petroleum Co. under the tradename of Ryton. Advantageously, Ryton ® may be purchased as a glass-filled compound, an example of such a compound being Ryton ® R-4XT, which is a 40% glass-filled compound.

Other pre-filled composites having utility in the practice of the present invention include glass-filled nylon 6/6, such as may be obtained from LNP Engineering Plastics of Exton, Pa., under the tradename of Verton. Another pre-filled composite known to have utility is a glass-filled polyphthalamide (PPA), such as may be obtained from Amoco Performance Products, Inc. of Atlanta, Ga., under the tradename of Amodel.

Figure 1:
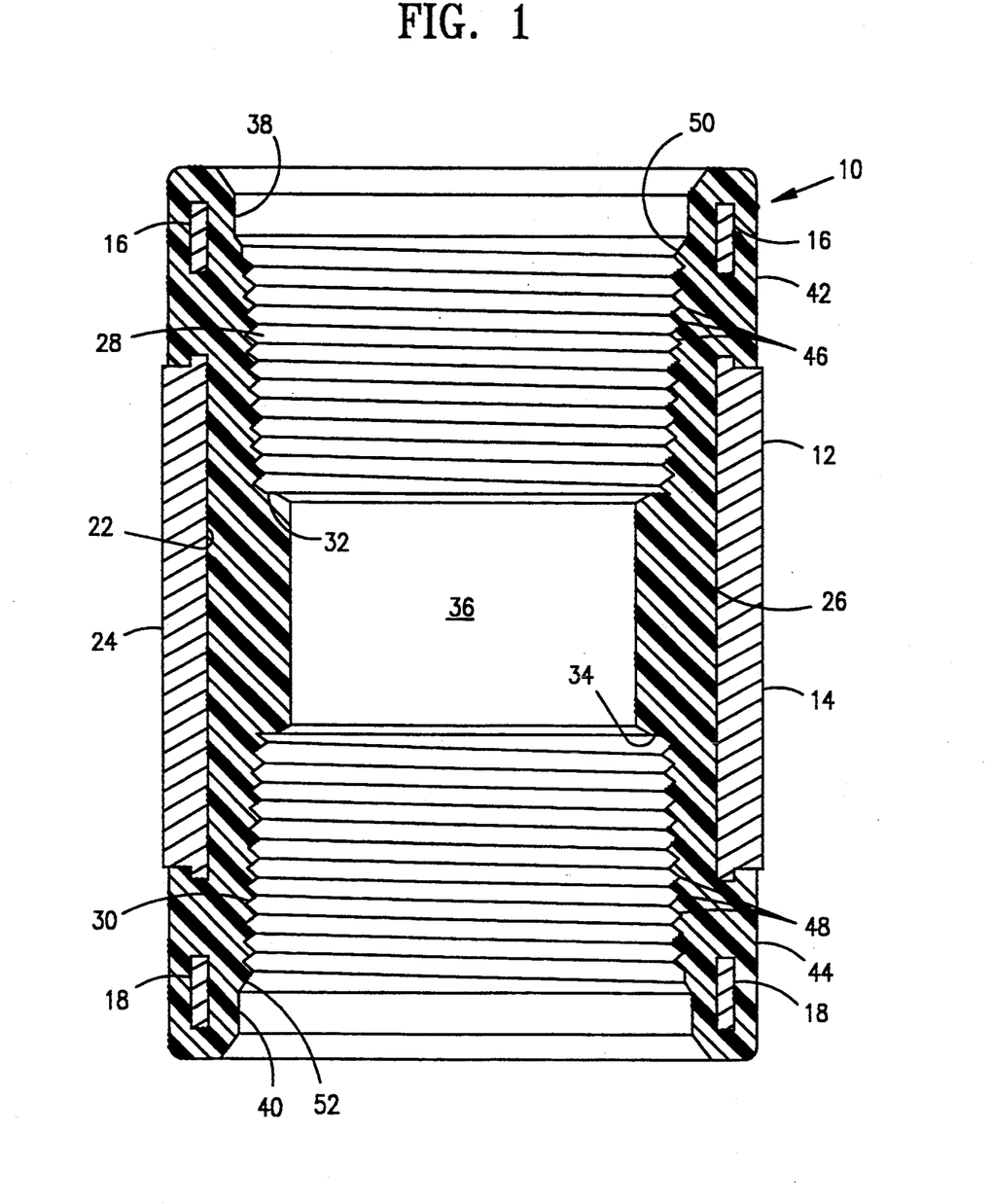
FIG. 1 presents a cross-sectional view of one embodiment of a corrosion-resistant coupling which employs a torque shoulder for use with tubular members having externally threaded ends, in accordance with the present invention.

Referring now to FIG. 1, a corrosion-resistant composite coupling 10 for use with tubular members having externally threaded ends, in accordance with the present invention, is shown in a cross-sectional view. Coupling 10 includes a stress-bearing sleeve member 12 to provide bending, tensile and radial strength to the overall structure. In particular, sleeve member 12 is effective in reducing hoop stress forces on the composite portion of coupling 10, therefore dramatically increasing the torque loading potential of the overall structure.

Figure 2:
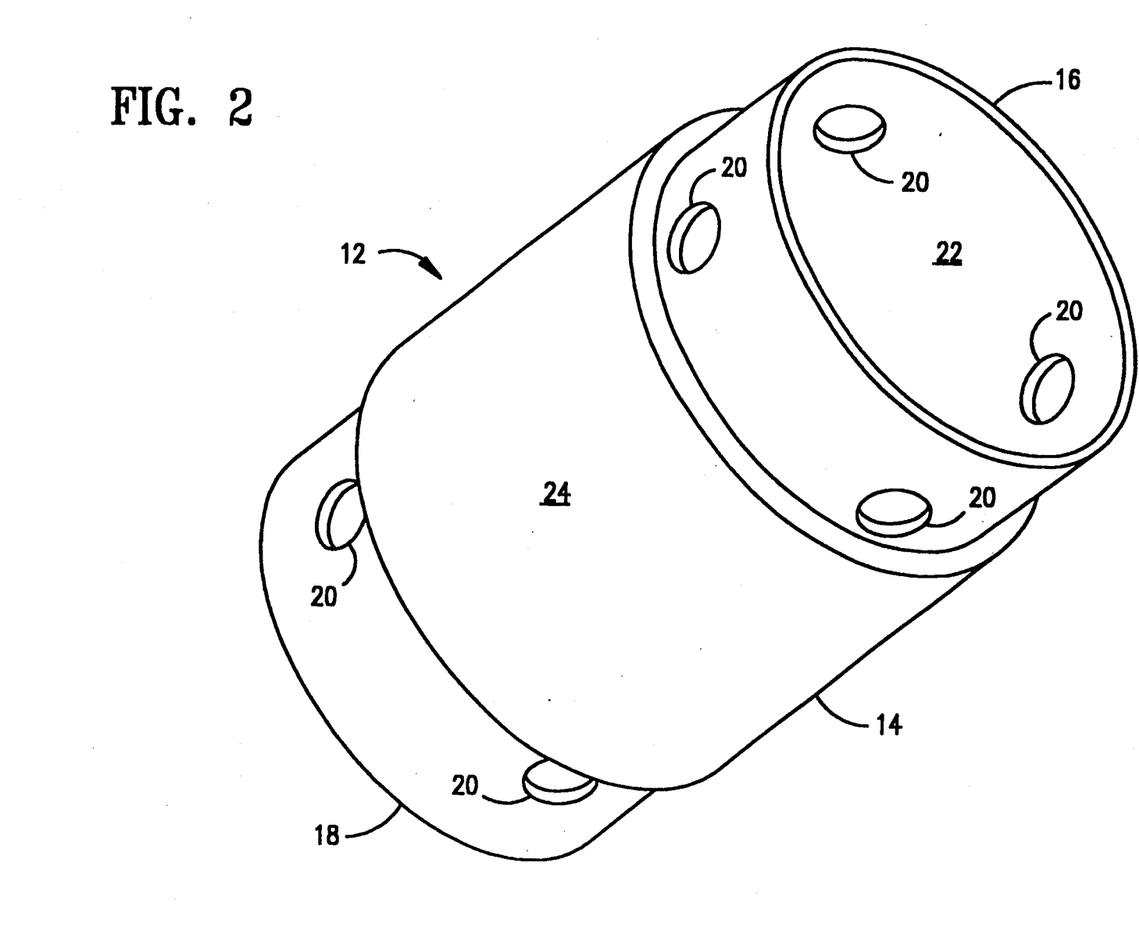
FIG. 2 is a perspective view of a stress-bearing sleeve member of the type employed in the FIG. 1 embodiment.

Reference is now made to FIG. 2 for details concerning the stress-bearing sleeve member 12 used in corrosion-resistant composite connection 10 of FIG. 1. FIG. 2 is a perspective view of stress-bearing sleeve member 12. Sleeve member 12 includes central portion 14 having an externally exposed surface 24 which provides a region which permits the use of conventional metal wrenches or tongs to be used to transfer torque to connection 10. Sleeve member 12 has at its first end, first core member 16 and at its second end, second core member 18. Each of core member 16 and core member 18 are provided with means for preventing sleeve member 12 from rotating independently of composite shell 26 (see FIG. 1) when a tangential force is applied to connection 10. In the FIG. 2 embodiment one preferred rotation-preventing means is shown, that means being a plurality of holes 20. As may be envisioned by jointly referring to FIG. 1, the interior surface 22 of sleeve member 12 has a single diameter, thus making the interior of sleeve member 12 cylindrical, although other configurations are suitable, as will be described in more detail hereinbelow.

Materials contemplated for use in forming stress-bearing sleeve member 12 include steel, iron, aluminum and other metals for this purpose and, in addition, high performance composites. Of the composites materials contemplated for use in sleeve member 12, those which employ woven or nonwoven fabrics or mats of glass, ceramic or synthetic fibers are particularly preferred. For use with oil field pipes and tubulars, steel is particularly preferred.

Referring again to FIG. 1, coupling 10 also includes a fiber-filled polymeric composite shell 26 having a first internally threaded portion 28 at a first end thereof, and a second internally threaded portion 30 at a second end thereof. Composite shell 26 is molded to sleeve member 12, by injection molding, so as to be coaxially aligned and in close conforming contact with at least a substantial portion of interior surface 22 of said sleeve member 12. As is preferred, and in contrast with tubular coatings technology, composite shell 26 will have a thickness of greater than about 0.04 inches and, as is particularly preferred, composite shell 26 will have a thickness in excess of 0.10 inches.

As shown in FIG. 1, each thread 46 of first internally threaded portion 28 and each thread 48 of second internally threaded portion 30 is comprised solely of composite material, in stark contrast with coated pipe and tubular technology wherein the threads are first cut in a metal member and then coated with a thin (less than 0.04 inch) polymeric coating. Moreover, as is particularly preferred, threads 46 and 48 are pointed on the minor diameter, the major diameter of threads 46 and 48 being conventionally rounded. Also provided is a first thread starting section 38 at a first end thereof, and a second thread starting section 40 at a second end thereof. Each thread starting section 38 and 40 is provided with an initial starting thread 50 and 52, respectively, to discourage cross threading on make-up.

As is well known by those skilled in the art, the American Petroleum Institute (API) has established standard tolerances for box and pin threads on tubular components used in oil field applications. API threads have a designed-in leak path that relies upon thread lubricant to seal or block this helically-shaped path. Proper make-up of the connections is often a problem with standard components. The particularly preferred pointed threads 46 and 48 deform and seal when made-up to a conventional API round thread, offering a particularly advantageous solution to the conventional thread sealing problem.

Still referring to FIG. 1, optional torque shoulders 32 and 34 are provided at the base of the first end and at the base of the second end of coupling 10, respectively. Torque shoulders 32 and 34 are provided when improved make-up characteristics are required and also serve to reduce turbulence in the "J-area" of the coupling by providing a smoother bore between pins of a coupled assembly. Located between torque shoulders 32 and 34 is cylindrical section 36 which is of a diameter selected to reduce turbulence between pins of a coupled assembly. As may be readily envisioned composite shell 26 essentially encapsulates core members 16 and 18, filling holes 20 and, thus, preventing sleeve member 12 from rotating independently of composite shell 26 when a tangential force is applied to connection 10 at external surface 14. The encapsulation of core members 16 and 18 provides essentially a three-layer structure at each end of coupling 10.

Figure 3:
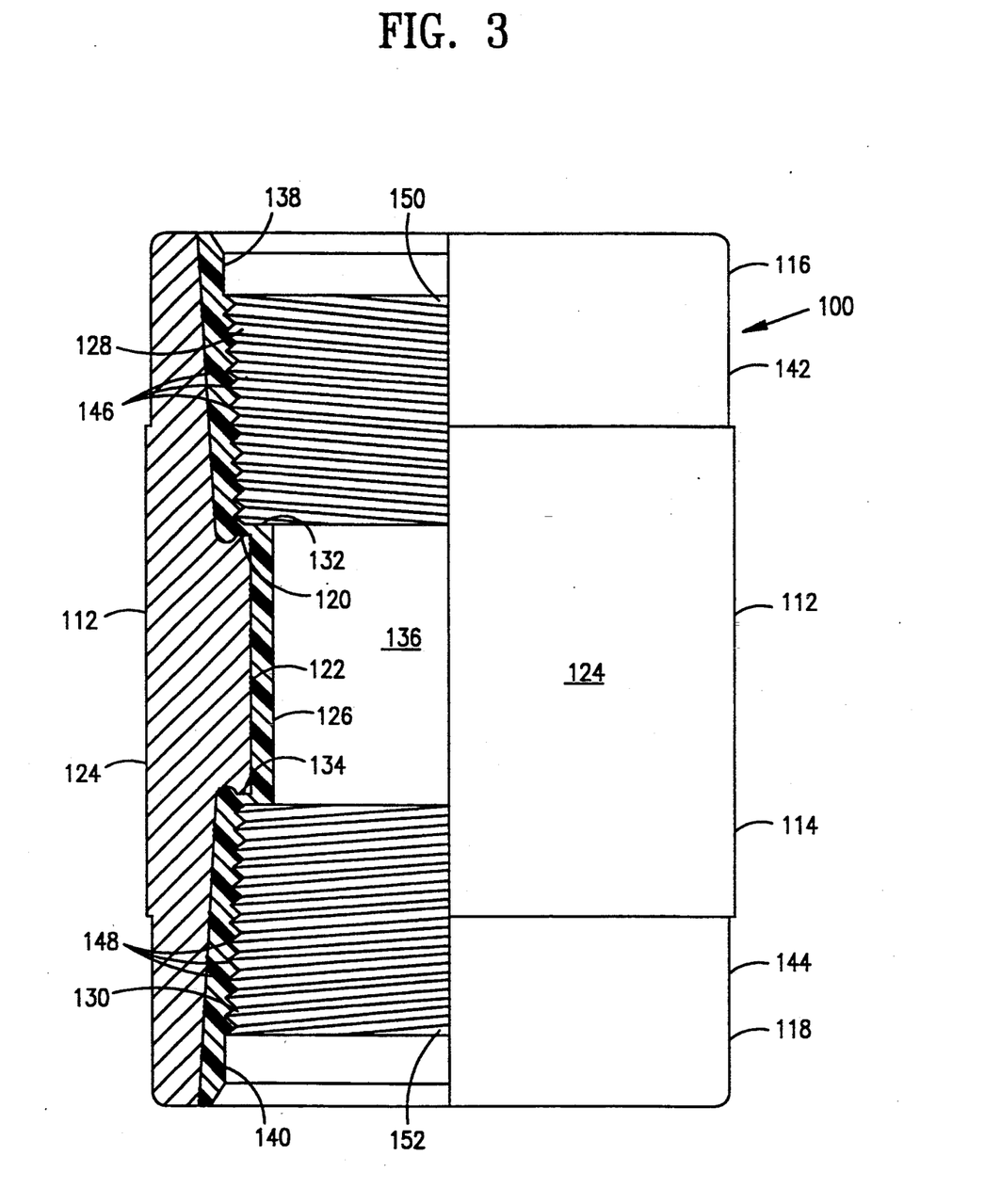
FIG. 3 presents a cross-sectional view of a second embodiment of a corrosion-resistant coupling employing a torque shoulder for use with tubular members having externally threaded ends, in accordance with the present invention.

Referring now to FIG. 3, a second embodiment of a corrosion-resistant composite coupling 100 for use with tubular members having externally threaded ends is shown in a partial cross-sectional view. Coupling 100 includes a stress-bearing sleeve member 112 to provide bending, tensile and radial strength to the overall structure. As was the case for the embodiment described above, sleeve member 112 is effective in reducing hoop stress forces on the composite portion of coupling 100, therefore dramatically increasing the torque loading potential of the overall structure. Sleeve member 112 includes central portion 114 having an externally exposed surface 124 which provides a region which permits the use of conventional metal wrenches or tongs to be used to transfer torque to connection 100. Sleeve member 112 has a first end 116 having an exposed surface 142 and a second end 118 having an exposed surface 144. Means for preventing sleeve member 112 from rotating independently of composite shell 126 when a tangential force is applied to connection 100 is also provided, the means depicted being a trapezoidal body 120 integral formed as part of sleeve member 112. As may be envisioned, the interior surface 122 of sleeve member 112 is irregularly formed, as contrasted with the single diameter surface of the FIG. 1 embodiment, thus aiding in the prevention of sleeve member 112's independent rotation from composite shell 126.

Materials contemplated for use in forming stress-bearing sleeve member 112 include steel, iron, aluminum and other metals for this purpose and, in addition, high performance composites. Of the composites materials contemplated for use in sleeve member 112, those which employ woven or nonwoven fabrics or mats of glass, ceramic or synthetic fibers are particularly preferred. For use with oil field pipes and tubulars, steel is particularly preferred.

Coupling 100 also includes a fiber-filled polymeric composite shell 126 having a first internally threaded portion 128 at a first end thereof, and a second internally threaded portion 130 at a second end thereof. As is particularly preferred, composite shell 126 is molded to sleeve member 112, by injection molding, so as to be coaxially aligned and in close conforming contact with at least a substantial portion of interior surface 122 of said sleeve member 112. Composite shell 126 will have a thickness of greater than about 0.04 inches and, as is particularly preferred, will have a thickness in excess of 0.10 inches.

As with the FIG. 1 embodiment of the present invention, each thread 146 of first internally threaded portion 128 and each thread 148 of second internally threaded portion 130 is comprised solely of composite material, in contrast with coated pipe and tubular technology and are pointed on the minor diameter, the major diameter of threads 146 and 148 being conventionally rounded. The particularly preferred pointed threads 146 and 148 deform and seal when made-up to a conventional API round thread. Also provided is a first thread starting section 138 at a first end thereof, and a second thread starting section 140 at a second end thereof. Each thread starting section 138 and 140 is provided with an initial starting thread 150 and 152, respectively, to discourage cross threading on make-up.

Torque shoulders 132 and 134 are provided at the base of the first end and at the base of the second end of coupling 100, respectively. Torque shoulders 132 and 134 provide improved make-up characteristics and also serve to reduce turbulence in the "J-area" of the coupling 100 by providing a smoother bore between pins of a coupled assembly, as indicated above. Located between torque shoulders 132 and 134 is cylindrical section 136 which is of a diameter selected to reduce turbulence between pins of a coupled assembly.

Figure 4:
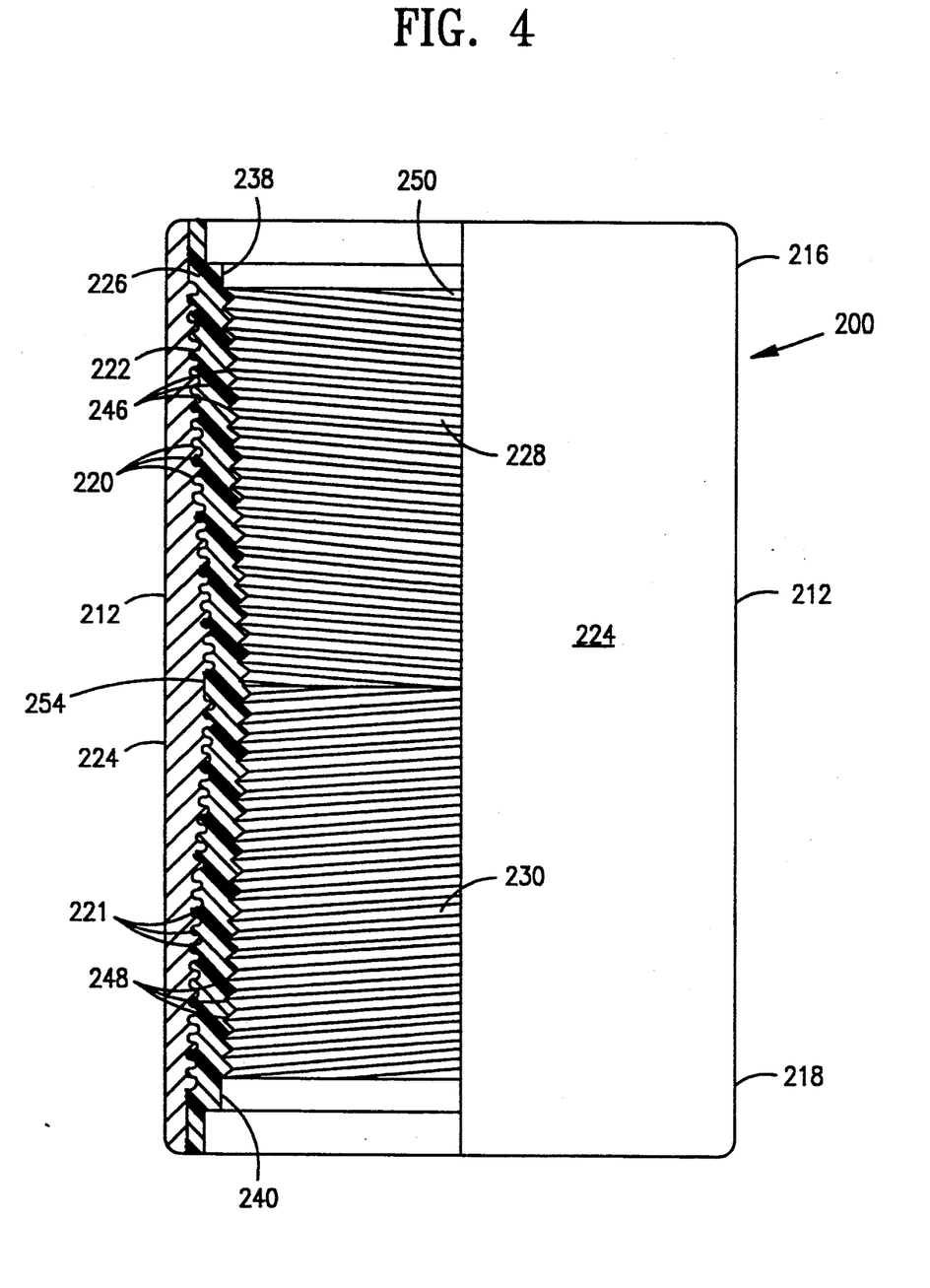
FIG. 4 presents a cross-sectional view of another embodiment of a corrosion-resistant coupling for use with tubular members having externally threaded ends, also in accordance with the present invention.

Referring now to FIG. 4, a particularly preferred embodiment of a corrosion-resistant composite coupling 200 for use with tubular members having externally threaded ends is shown in a partial cross-sectional view. Coupling 200 includes a stress-bearing sleeve member 212, once again, to provide bending, tensile and radial strength to the overall structure. Sleeve member 212 is effective in reducing hoop stress forces on the composite portion of coupling 200, dramatically increasing the torque loading potential of the overall structure. Materials contemplated for use in forming stress-bearing sleeve member 212 include steel, iron, aluminum and other metals for this purpose and, in addition, high performance composites. Of the composites materials contemplated for use in sleeve member 212, those which employ woven or nonwoven fabrics or mats of glass, ceramic or synthetic fibers are particularly preferred. For use with oil field pipes and tubulars, steel is particularly preferred.

Sleeve member 212 has an externally exposed surface 224 which provides a region which permits the use of conventional metal wrenches or tongs to be used to transfer torque to connection 200. Sleeve member 212 has a first end 216 and a second end 218. Means for preventing sleeve member 212 from rotating independently of composite shell 226 when a tangential force is applied to connection 200 is also provided, the means depicted being, as is particularly preferred, left-hand internally threaded sections 220 and 221 at first end 216 and second end 218, respectively. As may be envisioned, the substantially tapered and left-hand threaded interior surface 222 of sleeve member 212 is highly irregularly, as contrasted with the single diameter surface of the FIG. 1 embodiment. Moreover, by having threads running in opposite directions to the threads of the composite shell, any slippage which may transpire between the two layers is quickly eliminated by virtue of the interference thus provided.

Coupling 200 also includes a fiber-filled polymeric composite shell 226 having a first internally threaded portion 228 at a first end thereof, and a second internally threaded portion 230 at a second end thereof. As is particularly preferred, composite shell 226 is molded to sleeve member 212, by injection molding, so as to be coaxially aligned and in close conforming contact with at least a substantial portion of interior surface 222 of said sleeve member 212. Composite shell 226 will have a thickness of greater than about 0.04 inches and, as is particularly preferred, will have a thickness in excess of 0.10 inches.

As with the FIG. 1 and FIG. 3 embodiments of the present invention, each thread 246 of first internally threaded portion 228 and each thread 248 of second internally threaded portion 230 is comprised solely of composite material, in contrast with coated pipe and tubular technology and are pointed on the minor diameter, the major diameter of threads 246 and 248 being conventionally rounded. The particularly preferred pointed threads 246 and 248 deform and seal when made-up to a conventional API round thread. Also provided is a first thread starting section 238 at a first end thereof, and a second thread starting section 240 at a second end thereof. Each thread starting section 238 and 240 is provided with an initial starting thread 250 and 252, respectively, to discourage cross threading on make-up.

Although not shown in FIG. 4, torque shoulders can be optionally provided at the base of the first end and at the base of the second end of coupling 200, respectively, should improved make-up characteristics and reduced turbulence be required, as indicated above. If torque shoulders are provided, a cylindrical section (not shown) of a diameter selected to reduce turbulence between pins of a coupled assembly may also be provided, as described above.

The following example is presented to illustrate particular embodiments of the present invention and hence is illustrative of this invention and not to be construed in a limiting sense.

EXAMPLE

Three couplings were constructed in accordance with the present invention for evaluation, two 2⅜" diameter, 8 round composite tubing couplings and a 2⅞" diameter, 8 round composite tubing coupling. The two 2⅜" diameter, 8 round composite tubing couplings were of the type depicted in FIG. 3; the 2⅞" diameter, 8 round composite tubing coupling was of the depicted in FIG. 4. One 2-⅜" diameter, 8 round composite tubing coupling and the 2⅞" diameter, 8 round composite tubing coupling were injection molded from a composite material comprising about 40% of ¼" glass fibers and about 60% polyphenylene sulfide (PPS) resin, this composite material available from Phillips 66 Company of Bartlesville, Okla. as Ryton® R-4XT. The other 2⅜" diameter, 8 round composite tubing coupling was injection molded from a composite material comprising about 35% glass fibers and about 65% nylon 6/6, this composite obtained from LNP Engineering Plastics of Exton, Pa. as Verton® RF-7007. Each coupling employed a steel sleeve, the two 2-⅜" diameter couplings of the type depicted in FIG. 3; the 2-⅞" diameter coupling was of the type depicted in FIG. 4. The FIG. 4 sleeve employed left-hand internal threaded portions, as described above.

Testing of the 2⅜" Couplings

The initial torque loading test was conducted using the following procedure: a) the coupling was first screwed on a 4' pup joint and hand tightened; b) the coupling was then placed in the back-ups of a set of 4½" Eckel tongs, with the pup sub in the tong dies; and c) torque was then applied. Each coupling tested in this manner was able to withstand an application of torque in excess of 2,000 ft. lbs. without noticeable problems or failure.

Further testing was conducted on both couplings. Pressures in excess of 10,000 PSI and axial loads in excess of 100,000 lbs. were applied with no noticeable deformation. The two prototypes were then pressurized to over 2,000 PSI, using $CO_2$ for in excess of sixteen months without leakage. Following the successful containment of pressure, pressure was bled and the couplings visually inspected for defects, with no defects observed.

Each coupling was then placed in a test fixture and subjected to a parting test to determine the tensile force required to pull the coupling apart. A hydraulic ram capable of applying a tensile force of 400,000 pounds was used. The test fixture consisted of the ram equipped with an 8.452 inch bore and a 3.750 inch rod. In operation, as the rod moves down, it pulls the coupling down with it until a tension mandrel seats on a spacer tube. When seated, the retracting force appears as the tension force in the mandrel, and hence the tension force on the coupling. Pressure measurement was accomplished through the use of strain gage type pressure transducer (10,000 PSI rating) and a signal conditioner (available form Viatran). Tension was applied in steps starting at 15,000 pounds and incrementally increasing in steps of about 5,000 pounds through 30,000 pounds and in steps of about 2,500 pounds thereafter. For the glass-filled PPS coupling, failure was observed to occur at 39,200 pounds; while for the glass-filled nylon 6/6 coupling, failure was observed to occur at 32,000 pounds.

Testing of the 2⅞" Coupling: This glass-filled PPS coupling was placed in the above-described test fixture and subjected to a parting test to determine the tensile force required to pull the coupling apart. Pressure measurement was again accomplished through the use of strain gage type pressure transducer (10,000 PSI rating) and a signal conditioner (available form Viatran). Tension was applied in steps starting at 50,000 pounds and incrementally increasing in steps of about 10,000 pounds through 100,000 pounds and in steps of about 5,000 pounds thereafter. For the glass-filled PPS coupling, failure was observed to occur at 100,250 pounds.

From these tests, it was demonstrated that the use of the external steel sleeve is effective in combating hoop stress forces and dramatically increases torque loading. Moreover, the use of a external steel sleeve permits metal wrenches to be applied to the surface of the coupling to transfer torque to the composite shell. The use of an internal left-hand thread on the interior of the steel sleeve was found to be very effective in bonding the composite to the sleeve and assisting in the transfer of torque to the composite shell and also assists handling the axial loading of the coupling. For all couplings tested, the pointed threads on the minor diameter deformed effectively, providing a seal when made-up to a normal round threaded pin.

Advantages of the approach described herein include the fact that the cracking of plastic coatings on steel coated tubulars is eliminated. This is achieved as a result of the fact that the threads of the coupling deform instead of the pin. This eliminates corrosion in the thread area from exposure to corrosive materials. No internal torque shoulder is required to obtain a highly effective seal.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the amended claims.

What is claimed is:

1. A corrosion-resistant coupling for threadingly connecting onto a tubular member which, in turn, has an externally threaded end, said coupling comprising:
   (a) a stress-bearing sleeve member having an interior surface and an exposed exterior surface to which tangential force is applied in threading and unthreading said coupling from said tubular member:
   (b) a composite shell formed of fiber-filled polymeric material molded within said sleeve and in engagement with said interior surface of said stress-bearing sleeve, said composite shell being coaxially aligned within said stress-bearing sleeve and having internal threads at least one end adapted to threadingly engage with the external threads of said tubular member to provide a connection therebetween when rotated in a first direction and to disconnect said coupling from said tubular member when rotated in the opposite direction; and
   (c) means for preventing said sleeve member from rotating independently of said composite shell when tangential force is applied to the coupling.

2. The corrosion-resistant coupling of claim 1 wherein said rotation prevention means comprises:
   a plurality of threads on said interior surface of said stress-bearing sleeve adapted to cooperate with a plurality of external threads which are inherently formed on the exterior of said composite shell as said shell is molded within said sleeve; said cooperating interior threads on said sleeve and exterior threads on said shell having a direction of rotation opposite that of said internal threads on said composite shell.

3. The corrosion-resistant coupling of claim 2 wherein said cooperating interior threads on said sleeve and exterior threads on said shell are left-handed threads and said interior threads on said composite shell are right-handed threads.

4. The corrosion-resistant coupling of claim 1 wherein said rotation prevention means comprises:
   a trapezoidal body integrally formed on said interior surface of said sleeve member, said trapezoidal body having the fiber-filled polymeric material of said composite shell molded thereto so as to prevent said sleeve member from rotating independently of said composite shell.

5. The corrosion-resistant coupling of claim 1 wherein said rotation prevention means comprises:

a plurality of holes through said sleeve member, said plurality of holes being filled with said fiber-filled polymeric material of said composite shell so as to prevent said sleeve member from rotating independently of said composite shell.

6. The corrosion-resistant coupling of claim 1 wherein said composite shell has a thickness of greater than about 0.04 inches.

7. The corrosion-resistant coupling of claim 1 wherein said internal threads on said composite shell are pointed on a minor diameter.

8. The corrosion-resistant coupling of claim 7 wherein said pointed threads are deformable to provide a seal with tubulars having conventional API round threads.

9. The corrosion-resistant coupling of claim 1 wherein said fiber-filled polymeric material comprises:
a mixture of fibers combined in a polymeric matrix wherein said fibers are selected from the group consisting of glass, ceramic, carbon, asbestos, polyamides, polyesters, aramids and mixtures thereof.

10. The corrosion-resistant coupling of claim 9 wherein said fibers of said composite mixture comprise at least about 40% of said composite mixture, on a volumetric basis.

11. The corrosion-resistant coupling of claim 10 wherein said fibers of said composite material have lengths ranging from about 0.1 to about 0.4 inches.

12. The corrosion-resistant coupling of claim 11 wherein said fibers of said composite material have an average length of about 0.25 inches.

13. The corrosion-resistant coupling of claim 12 wherein said polymeric matrix material of said composite material is selected from the group consisting of epoxy resins, phenolic resins, melamine resins, silicone resins, hydrocarbon-based resins, vinyl ester resins, polyester resins, nylon resins and other thermoplastic and thermosetting resin materials.

14. The corrosion-resistant coupling of claim 12 wherein said polymeric matrix material comprises an arylene sulfide polymer.

15. The corrosion-resistant coupling of claim 12 wherein said polymeric matrix material comprises a polyphenylene sulfide.

* * * * *